United States Patent [19]

Willis, Jr.

[11] 3,737,720
[45] June 5, 1973

[54] LIGHTING SYSTEM WITH AUXILIARY LAMP CONTROL CIRCUIT

[75] Inventor: Candler A. Willis, Jr., Zirconia, N.C.

[73] Assignee: General Electric Company, Pittsfield, Mass.

[22] Filed: Aug. 2, 1971

[21] Appl. No.: 167,978

[52] U.S. Cl. .................................315/91, 315/92
[51] Int. Cl. ........................................H05b 39/10
[58] Field of Search..................315/88–92, 121

[56] References Cited
UNITED STATES PATENTS 3,517,254  6/1970  McNamara......................315/92 X
2,043,023  6/1936  Westendorp......................315/92 X

*Primary Examiner*—Roy Lake
*Assistant Examiner*—James B. Mullins
*Attorney*—Sidney Greenberg, J. Wesley Haubner, Frank L. Neuhauser et al.

[57] ABSTRACT

Electrical ballast circuit for operating gaseous discharge lamp is combined with an incandescent lamp circuit having relay control means for automatically turning the incandescent lamp on when the discharge lamp goes off. The arrangement provides for the auxiliary incandescent lamp to remain on until the discharge lamp is re-started and reaches substantially normal illumination level, after which the incandescent lamp is automatically turned off.

4 Claims, 4 Drawing Figures

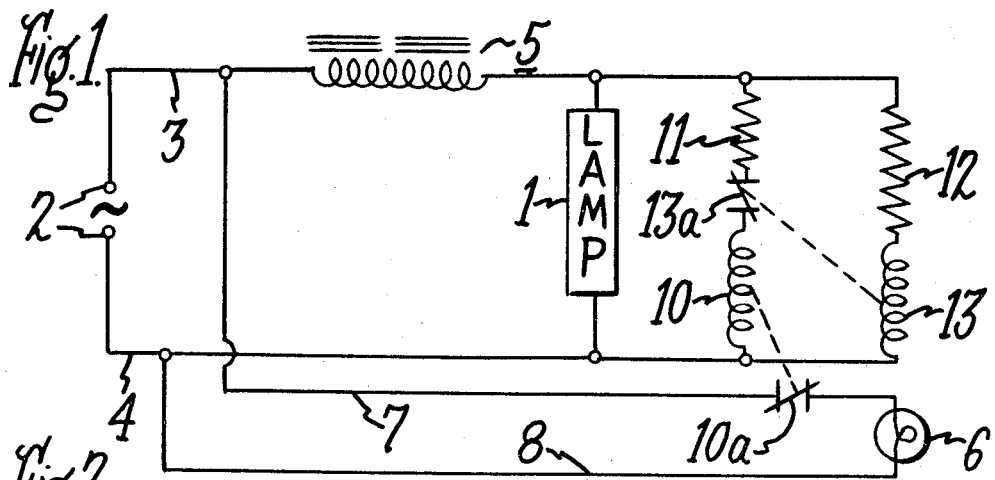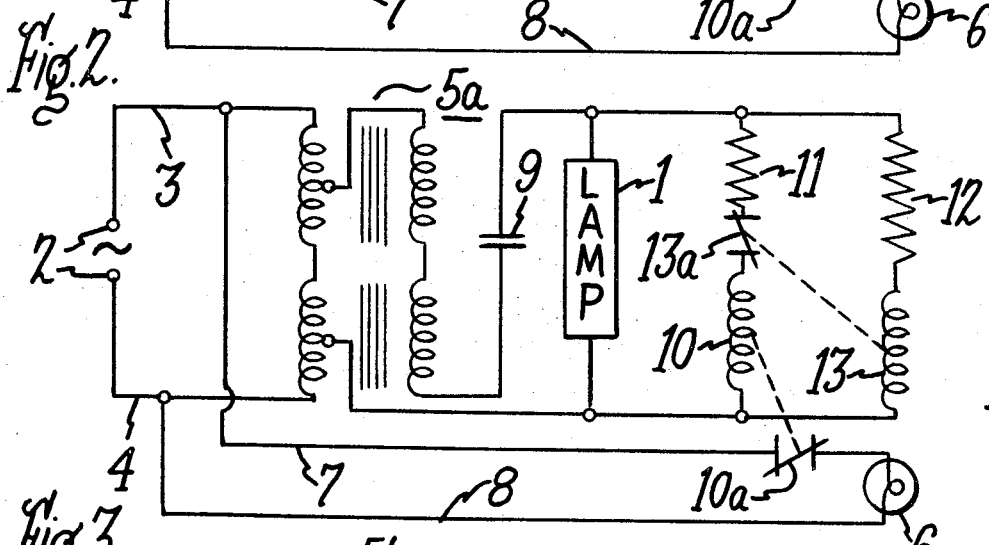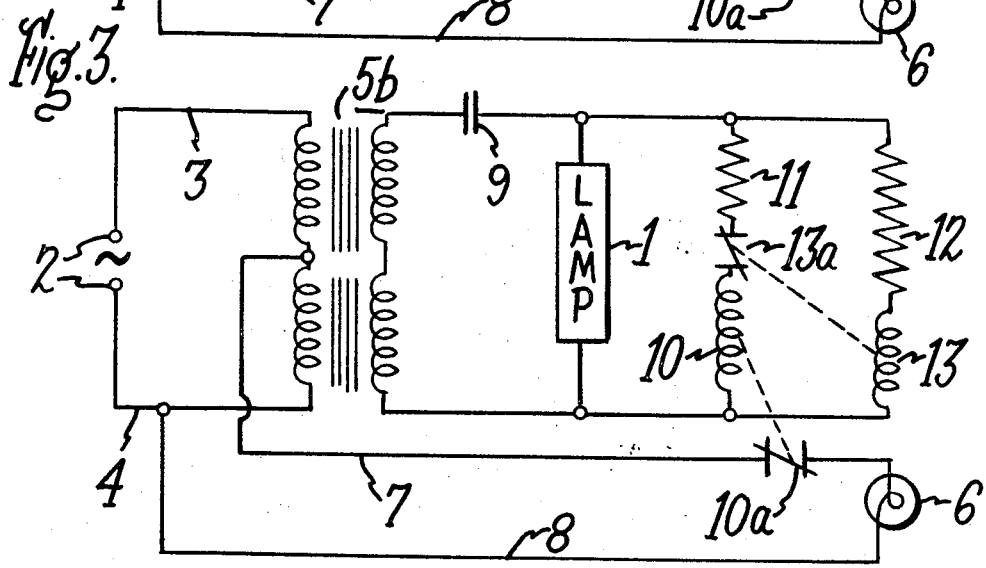

LIGHTING SYSTEM WITH AUXILIARY LAMP CONTROL CIRCUIT

It is an object of the invention to provide a combined operating circuit for a gaseous discharge lamp and an incandescent lamp whereby the incandescent lamp is automatically turned on when the gaseous discharge lamp is extinguished.

It is another object of the invention to provide a circuit of the above description whereby the incandescent lamp is maintained in operation until the gaseous discharge lamp is re-started and reaches normal operating condition, after which the incandescent lamp is automatically turned off.

Still another object of the invention is the provision of a control circuit for operating an auxiliary incandescent lamp as described above which is simple and economical in structure, and is readily combined with gaseous discharge lamp circuits incorporating any of various types of electrical ballasts.

Other objects and advantages will become apparent from the following description and the appended claims.

With the above objects in view, the present invention in one of its aspects relates to a lighting system comprising, in combination, a gaseous discharge lamp, voltage supply means connected to the gaseous discharge lamp, ballast means connected between the gaseous discharge lamp and the voltage supply means, the gaseous discharge lamp having a low voltage across the same during its starting period, having an intermediate voltage across the same during its normal operation period, and having a high voltage across the same during its non-operating period, an auxiliary lamp such as an incandescent lamp serving as a stand-by lamp for the gaseous discharge lamp, means for connecting the auxiliary lamp to a source of electrical current, and control means selectively responsive to the low, intermediate, and high voltages for turning on the auxiliary lamp during the high voltage non-operating and low voltage starting period of the gaseous discharge lamp and for turning off the auxiliary lamp during the intermediate voltage normal operation period of the gaseous discharge lamp.

The invention will be better understood from the following description taken in conjunction with the accompanying drawing, in which:

FIG. 1 is a circuit diagram of an embodiment of the invention in which a reactor ballast is employed;

FIG. 2 is a circuit diagram of the invention in which an autotransformer regulator ballast is employed;

FIG. 3 is a circuit diagram of the invention in which a regulator ballast with isolated primary is employed; and FIG. 4 shows a modification of the control circuit in accordance with the invention.

Referring now to the drawing, and particularly to FIG. 1, there is shown a starting and operating circuit for gaseous discharge lamp 1 connected by means of line conductors 3 and 4 to terminals 2 of a source of alternating current, typically 240 volts. Connected in supply line 3 in series with discharge lamp 1 is an inductive reactance 5 in the form of an induction coil which serves as an electrical ballast to provide a maximum current in the discharge lamp circuit and limits the amount of current that can be drawn by lamp 1, as conventional in the art. Discharge lamp 1 may be, for example, a mercury vapor, metal halide or sodium vapor lamp, such as commonly referred to as high intensity discharge lamps. It is of the type that upon being extinguished, due to interruption of supply current or a drop in voltage across the line, or other causes, will not re-ignite until it has cooled off, even after normal supply current has been restored. As a result, the light from one or more luminaires using such gaseous discharge lamps and operated from the same electrical supply system may suddenly fail due to a transient fault in the system, and darkness will prevail for the several minutes necessary to allow the discharge lamps to cool sufficiently to permit re-ignition.

In accordance with the invention, this difficulty is overcome by providing an auxiliary lighting circuit and control circuit therefor in combination with the described main lighting circuit, by means of which an auxiliary or stand-by lamp, such as an incandescent lamp, will automatically be turned on when the gaseous discharge lamp goes out, will remain on during the interval for re-starting the discharge lamp and will automatically be turned off after the discharge lamp resumes normal operation at full illumination. In discharge lamp circuits of the above described type, the discharge lamp has a relatively low voltage across it, e.g., about 15 volts, during the period for starting the lamp, and during normal lamp operation it has an intermediate voltage, e.g., about 132 volts. When the lamp is not operating, there is a relatively high voltage across it, e.g., about 240 volts. In accordance with the invention, the control circuit for controlling the operation of the auxiliary lamp is made selectively responsive to the various voltage levels across the discharge lamp corresponding to the starting, operating, and non-operating periods described.

In a preferred embodiment as shown in FIG. 1, an incandescent lamp 6 is connected by means of conductors 7, 8 across the electrical supply terminals 2 in the main lighting circuit. Connected across discharge lamp 1 is a coil 10 of a relay having normally closed switch contacts 10a connected in series with auxiliary lamp 6 in the latter circuit. Connected in series with relay coil 10 is a resistance 11. In another branch parallel to relay coil 10 and resistance 11 is a resistance 12 in series with relay coil 13 which has normally closed switch contacts 13a arranged in series with relay coil 10. In one embodiment of the described circuit, both relays 10 and 13 may be of the same rating, while resistance 11 is selected to be of substantially lower value than resistance 12. For example, in a typical case, where a voltage supply of about 240 volts is used, resistance 11 would be about 2,200 ohms and resistance 12 would be about 18,000 ohms, and both relays would open at about 70 volts across their respective coils at a current of 7 milliamperes. In another embodiment, the respective relays are selected such that relay coil 10 has a lower impedance than relay coil 13, and separate resistances 11 and 12 may be omitted from the circuit.

The circuits shown in FIGS. 2 and 3 are similar to that shown in FIG. 1 except that different ballast components are employed. Thus, in FIG. 2, ballast 5a depicted is a known type of autotransformer regulator ballast, with a capacitor 9 arranged in series with the secondary winding of the autotransformer and discharge lamp 1 to provide lamp current regulation, as well understood in the art. In the FIG. 3 circuit, ballast 5b is a known type of regulator ballast including an isolation transformer.

While the auxiliary incandescent lamp 6 is shown connected to the supply source for the main lighting circuit, it will be understood that it may alternatively be connected to a separate alternating current electrical supply or to a direct current source such as a battery, if desired.

In the operation of the circuit described, when discharge lamp 1 is being started, a relatively low voltage appears across lamp 1 and the parallel connected relay coils 10 and 13. This voltage is too low to actuate the normally closed switch contacts 10a and 13a, and as a result, auxiliary lamp 6 remains on during the starting interval. When discharge lamp 1 reaches substantially normal operation, the voltage supply to the discharge lamp 1 and control circuit is at intermediate level, and under these conditions, whereas relay 13 is not actuated so that contacts 13a remain closed, relay 10 is actuated by this intermediate voltage and opens contacts 10a, turning off auxiliary lamp 6. When discharge lamp 1 is extinguished for any reason and the current supply is on, the open circuit voltage across 1 is relatively high. Under these conditions, relay 13 is actuated, opening its contacts 13a so that relay coil 10 is de-energized, closing its contacts 10a and turning on auxiliary lamp 6. The latter lamp remains on until discharge lamp 1 is re-started and reaches substantially its normal operating voltage, as described above.

In a modification of the described control circuit as shown in FIG. 4, a capacitor 14 is arranged in series with relay coil 10, and resistor 11 is omitted. The capacitive reactance of capacitor 14 is selected so as to cancel the inductive reactance of coil 10, thus reducing the voltage which need be impressed on coil 10 to actuate the relay. Such a result would be desirable where the intermediate, operating voltage level of lamp 1 is less than the actuating voltage of the relay itself. Where the relay has the particular rating described above, capacitor 14 would be about 0.33 microfarad, for example.

As understood by those versed in the art, the resistors, relay coils and capacitor employed in the described control circuits provide linear impedances in the circuits.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Lighting system comprising, in combination, a gaseous discharge lamp, voltage supply means connected to said gaseous discharge lamp, ballast means connected between said gaseous discharge lamp and said voltage supply means, said gaseous dscharge lamp having a low voltage across the same during its starting period, having an intermediate voltage across the same during its normal operation period, and having a high voltage across the same during its non-operating period, an auxiliary lamp serving as a stand-by lamp for said gaseous discharge lamp, means for connecting said auxiliary lamp to a source of electrical current, and control means selectively responsive to said low, intermediate, and high voltages non-operating and low voltage starting periods of said gaseous discharge lamp and for turning off said auxiliary lamp during said intermediate voltage normal operation period of said gaseous discharge lamp, said control means comprising first and second relay means, said first relay means having a first coil connected across said gaseous discharge lamp and normally closed first switch contacts connected in series with said auxiliary lamp, said second relay means having a second coil connected in parallel with said first coil and normally closed second switch contacts connected in series with said first coil, said first coil operating during said intermediate voltage period to open said first switch contacts for turning off said auxiliary lamp, said second coil operating during said high voltage period to open said second switch contacts for turning on said auxiliary lamp, both said first and second coils being non-responsive to said low voltage for maintaining said auxiliary lamp on during said starting period, said first and said second coil each having linear impedance associated therewith, the linear impedance associated with said first coil being lower than the linear impedance associated with said second coil.

2. A lighting system as defined in claim 1, wherein said linear impedances comprise a first resistor in series with said first coil and a second resistor in series with said second coil, said first resistor having lower resistance than said second resistor.

3. A lighting system as defined in claim 1, wherein the impedance of said first coil is lower than the impedance of said second coil.

4. A lighting system as defined in claim 1, wherein the linear impedance associated with said first coil comprises a capacitor in series with said first coil, the capacitive reactance of said capacitor being such as to substantially cancel the inductive reactance of said first coil.

* * * * *